Feb. 19, 1935.                F. W. SAMPSON                1,991,579
                         TORSIONAL REACTANCE DAMPENER
                            Filed July 29, 1932
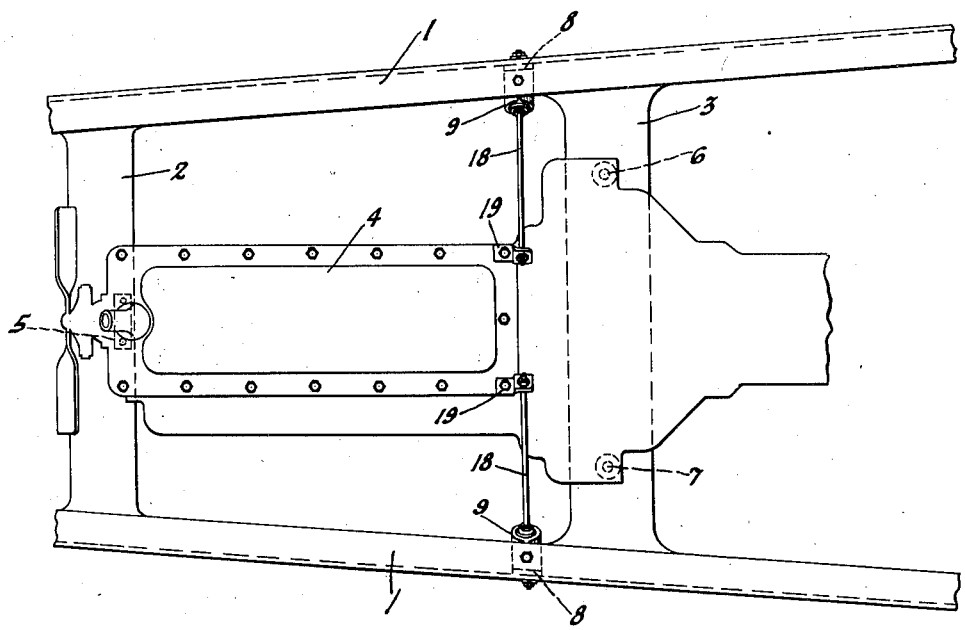
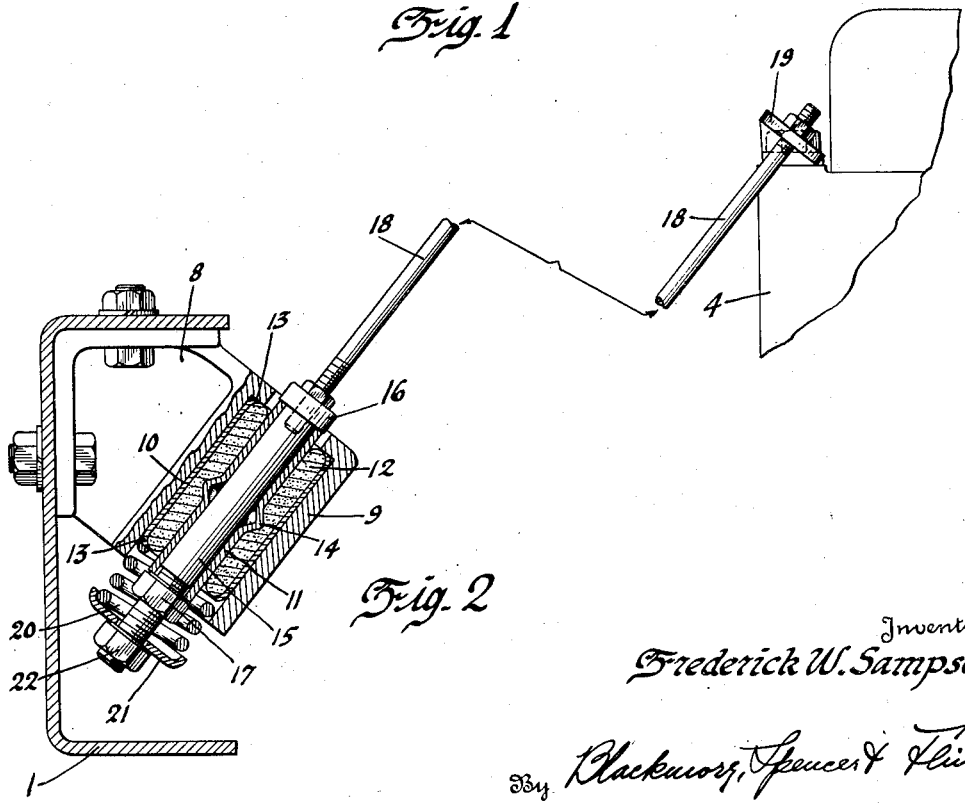
Inventor
Frederick W. Sampson Patented Feb. 19, 1935

1,991,579

UNITED STATES PATENT OFFICE 1,991,579

TORSIONAL REACTANCE DAMPENER

Frederick W. Sampson, Dayton, Ohio, assignor to Inland Manufacturing Company, Dayton, Ohio, a corporation of Delaware Application July 29, 1932, Serial No. 626,043

3 Claims. (Cl. 248—14.2)

This invention relates to devices for cushioning thrusts, and more particularly to an arrangement for positioning an internal combustion engine or the like, in a motor vehicle frame or other suitable support.

It is among the objects of the invention to carry the weight of the engine by means of resilient mountings which will permit certain relative movements between the engine and its support or base so as to prevent the transmission to the support of engine vibrations and to restrict the extent of movement and damp the forces through a yieldable connection between the engine and supporting base.

A further object of the invention is to provide a stabilizer connection comprising a pair of relatively movable members having a body of rubber interposed therebetween in non-slipping engagement therewith, to resist thrust in either direction from an intermediate or neutral position through a shearing action on the rubber.

The invention includes various details of construction, which will be more fully described hereinafter in connection with the accompanying drawing, wherein Figure 1 is a top plan view of an engine mounted in the motor vehicle chassis frame in accordance with the invention, and Figure 2 is a transverse section of the engine steadying mechanism.

Referring to the drawing, the reference numerals 1—1 indicate a pair of longitudinal side members of the chassis frame, having at spaced intervals a series of cross members 2 and 3. A power plant 4, which may include an engine, clutch and transmission, is supported upon the chassis frame in any convenient manner, but preferably by means of rubber connections, which will not only allow the engine to move relative to the frame upon vibration, but also serve as sound deadening insulation. In the drawing, the front of the engine is indicated as being connected to the frame member 2 at a central point 5, and the rear of the engine is connected to the cross member 3 at the points 6 and 7 along opposite sides of the engine. In other words, the drawing shows an engine mounted in rubber at three points, but it is to be understood that this particular arrangement is merely for illustrative purposes, and that the invention contemplates broadly any form of mounting which allows relative movement.

To limit the extent of movement, and to cushion the forces incident thereto, it is proposed to use one or more resilient connections at suitable locations, between the engine and frame or some part associated with the frame. Two of such connections are here illustrated, one at each side of the power plant and at the rear of the cylinder block, the parts thereof lying in a downwardly and outwardly inclined plane and extending from the upper portion of the block to the frame. Both stabilizers are, by preference, of similar construction as to details, and only one will be described.

Each frame member 1 may be provided with a suitable bracket 8 having a circular head 9, in which is formed a cylindrical pocket to receive a cushioning unit or resilient joint. The resilient unit preferably consists of an outer member or metal shell 10, and an inner member or metal tube 11, having interposed therebetween a sleeve 12 of rubber or other elastic deformable material. The rubber sleeve 12 is preferably under considerable initial pressure so that its inner and outer surfaces tightly cling in non-slipping engagement with the surfaces of the inner and outer members with which the rubber is engaged. A satisfactory method of making the assembly is to place a rubber sleeve between the shell and tube and then reduce the diameter of the outer tube as by a swaging operation, causing the rubber to elongate or flow toward opposite ends. To retain the parts in assembly and aid the frictional contact between the parts, the opposite ends of the outer shell may be bent inwardly as at 13, and the inner tube 11 may be provided intermediate its ends with an annular bulge or outward projection 14. The rubber sleeve 12 being deformable in all directions will permit relative movement between the inner and outer members, and any relative axial movement of these parts will tend to place the rubber in endwise shear and tension. Axial movement in either direction from the normal position of the parts will thus be resisted and the force or energy absorbed in overcoming the resistance.

The cushioning characteristics of the unit is made available for damping engine vibration by press fitting the outer sleeve 10 in the pocketed head 9 of the bracket, and by rigidly connecting the inner tube 11 with the engine. This last mentioned connection may be effected by the use of a headed bolt 15 inserted through the sleeve 11, with its enlarged head 16 engaging one end of the sleeve, and a nut 17 threaded on the bolt, engaging the opposite end of the sleeve 11. A screw threaded aperture in the headed end of the bolt may be provided to receive one end of a tie rod or thrust transmitting member 18, which is connected at its opposite end to a suitable bracket 19, conveniently secured to the cylinder block by one of the usual cylinder head bolts. In this fashion any rocking or other movement of the engine will be transmitted to the inner sleeve 11 and the energy damped or spent in overcoming the resistance to deformation of the rubber.

When two of such connections are employed it will be found desirable to supplement the action of the rubber cushion as by means of a coil spring 20 interposed under an initial compression between the outer shell 10 or any other fixed part of the bracket 8 and a washer or seat 21, carried on the bolt 15 as by means of the adjustable element or nut 22, threaded on the bolt. It will be apparent that the use of springs acting in opposition to each other will tend to maintain the joint parts and the engine in a normal or centered position, and that forces incident to movements in either direction away from such centered position will be effectively dissipated in the manner described.

While but one embodiment has been illustrated, it is to be understood that the invention is not necessarily limited to the exact details described but that such modifications can be made as come within the scope of appended claims.

I claim:

1. For use with an engine resiliently mounted in a support, a pair of tie elements extending from opposite sides of the engine, an elastic element between the support and each tie element, said elastic elements acting in opposition to each other and having a tendency to maintain the engine in a centered position in the support, and a yieldable motion resisting device associated with at least one of said tie elements and comprising a body of rubber adapted to resist thrust of the tie element upon movement of the engine in either direction from its centered position, through shear on the rubber.

2. For use with an engine movably mounted in a support, engine stabilizer mechanism including elastic elements exerting forces in opposition to each other and tending to maintain the engine in centered position, and a rubber device adapted to augment the action of said elastic elements and arranged to resist engine thrust in both directions away from centered position through shear of the rubber.

3. For use with an engine resiliently mounted in a frame, a cushioning unit including a bracket adapted for attachment to a frame and provided with a pocket therein, a central bolt projecting through the pocket for rigid connection with the engine so as to move therewith, a body of elastic deformable material enclosed by the pocket and resiliently connecting the bolt to the bracket, and a compression spring interposed between the bolt and bracket and exerting axial force on the bolt.

FREDERICK W. SAMPSON.